Aug. 22, 1967 T. O. ALGER 3,337,811

MAGNETIC AMPLIFIER

Filed Dec. 5, 1963 2 Sheets-Sheet 1

INVENTOR.
TRYGVE O. ALGER

BY

Brumbaugh, Free, Graves & Donohue his ATTORNEYS.

INVENTOR.
TRYGVE O. ALGER
BY
Brumbaugh, Free, Graves & Donohue
his ATTORNEYS.

United States Patent Office
3,337,811
Patented Aug. 22, 1967

3,337,811
MAGNETIC AMPLIFIER

Trygve O. Alger, Norwalk, Conn., assignor to Harrel, Incorporated, East Norwalk, Conn., a corporation of Delaware Filed Dec. 5, 1963, Ser. No. 328,242
11 Claims. (Cl. 330—8)

ABSTRACT OF THE DISCLOSURE

A balanced magnetic amplifier having two gate windings wound around a single core and connected in out of phase relationship to an A-C voltage source. The gate windings have biased rectifiers connected in series with each such that current flows through a different one of the gate windings during a portion of alternate half cycles of the A-C voltage source to equal loads across which the output is taken. An input signal coupled to the core through a control winding controls the impedance relationship between the gate windings, and hence the output voltage, by drawing the core toward either positive or negative saturation during the portions of the voltage source half cycles when current is not flowing through either of the gate windings.

This invention relates to balanced magnetic amplifiers.

Magnetic amplifiers have been widely used due to their reliability, ruggedness and other advantageous characteristics. In circuits requiring low distortion, balanced half wave magnetic amplifiers were formed by connecting two half wave amplifiers back to back to provide a net output voltage of one polarity for one direction of control current and the other polarity for the reverse direction. With this connection changes in the magnetic characteristics of the two saturable magnetic cores does not cause any shift in the zero point of the amplifier since the effects of such changes cancel in the output, In contrast, in an unbalanced half wave amplifier with one core, such changes in the magnetic characteristics of the single core result in objectionable drift.

Differences in the change of characteristics in the two cores of a balanced magnetic amplifier will, however, cause drift in the output. Even matching cores carefully to provide the same drift characteristics does not produce exact balance in the balanced magnetic amplifiers known in the prior art.

The present invention overcomes the above described disadvantages of balanced magnetic amplifiers by providing a balanced half wave magnetic amplifier using a single magnetic core. With this arrangement, changes in core characteristics from whatever cause are balanced and do not affect the zero point of the amplifier. The inventive magnetic amplifier, instead of using one voltage half cycle for current in the control winding to act on the core and the other voltage half cycle for current in the gate windings to act on the core, as in the prior art balanced magnetic amplifiers, connects two gate windings in out of phase relation to a voltage source to divide the voltage half cycles between the two gate windings which form the two sides of the amplifier. The half cycles are then further divided with a portion being devoted to control action in the core and the remainder to load action in the core. In other words, control action and load action in the inventive amplifier take place during each half cycle and therefore only a single core is required for a balanced half wave amplifier, and two cores for a balanced full wave amplifier.

These and further advantages of the invention will be more readily understood when the following description is read in conjunction with the accompanying drawings, in which.

Figure 1:
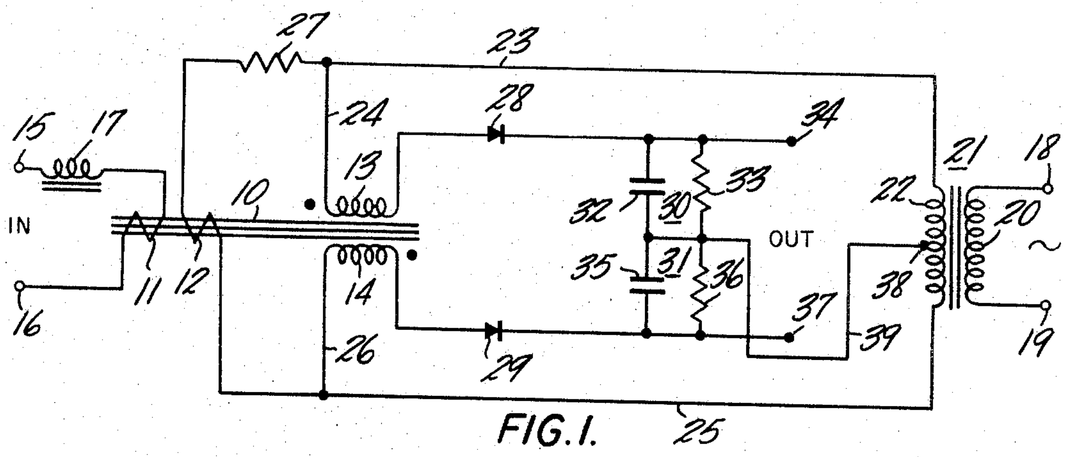
FIGURE 1 is a circuit diagram of a single core balanced half wave magnetic amplifier embodying the principles of the present invention.

Examining a typical embodiment of the invention with reference to FIGURE 1, a saturable magnetic core 10, preferably having a square loop characteristic, carries a control winding 11, a bias winding 12 and a pair of gate windings 13 and 14. Input terminals 15 and 16 are coupled to the control winding 11 through a choke 17 to provide high impedance in the input circuit to induced A-C voltages. The choke may be omitted if the control circuit presents a high impedance to A-C voltages.

Terminals 18 and 19 joined to a primary winding 20 of a transformer 21 are adapted to be connected to a source of voltage having periodic reversals of polarity and non-uniform in magnitude over each voltage half cycle, for example, a sine wave or triangular wave voltage.

A secondary winding 22 on the transformer 21 has its opposite ends joined through conductors 23, 24 and 25, 26 to one side of the gate windings 13 and 14 suitably polarized, as shown, to drive the core 10 in opposite directions on alternate half cycles of the source. A bias resistor 27 connected in a series circuit including the bias winding 12 and the transformer secondary 22 sets the operating point of the control winding 11. Any other suitable biasing means for the core 10 may also be used.

The other sides of the gate windings 13 and 14 are coupled by rectifiers 28 and 29, for example silicon diodes, to output circuits 30 and 31, respectively. The output circuit 30 includes a capacitor 32 in parallel with a resistor 33 and having one side joined to an output terminal 34. The output circuit 31 includes a capacitor 35 in parallel with a resistor 36 and having one side coupled to a second output terminal 37. A center tap 38 on the secondary winding 22 is joined by a conductor 39 to the other sides of the output circuits 30 and 31.

To understand the operation of the single core balanced half wave amplifier shown in FIGURE 1, it will be assumed that the bias resistor 27 is infinite in value, the control current flowing through the control winding 11 is zero, and the volt seconds required to cause the saturable core 10 to travel from positive to negative saturation and vice versa is two-thirds that available from each side of the secondary winding 22. During the voltage half cycle when the top of the secondary 22 is positive, the diode 28 will conduct and, assuming the condition of the core 10 at negative saturation, the core starts towards positive saturation. During this initial period the core exhibits high impedance because it is unsaturated and a minimum current flows through the diode 28. Two thirds through the half cycle, however, the core 10 saturates, the impedance through the gate winding 13 drops sharply and current flows through the diode 28 to charge the capacitor 32 to approximately the instantaneous value of the sine wave (assuming a sine wave source) two-thirds through the half cycle.

On the next or alternate half cycle of operation, the same sequence is repeated through the gate winding 14 and the diode 29 to charge the capacitor 35 as the bottom half of the secondary winding 22 drives the core 10 towards negative saturation.

Therefore, at the end of two half cycles of operation, the capacitors 32 and 35 will be charged approximately to the instantaneous voltage of the sine wave two thirds through the half cycle and the core will again be in a condition of negative saturation, assuming that the charging resistance in series with the capacitors is low and that any resistance across the load terminals 35 and 37 is relatively high.

At the beginning of the third half cycle, the gate winding 13, although in a series circuit having impressed thereacross a voltage half cycle tending to cause current flow therethrough, does not have a voltage applied across it as before because the diode 28 is blocked or cut off due to a blocking voltage across the capacitor 32. Not until one third of the way through the half cycle will the voltage be high enough to unblock the diode 28 and impress a voltage across the gate winding 13. The remaining two thirds of the voltage cycle is sufficient to carry the saturable core 10 from negative to positive saturation.

During the fourth half cycle the same sequence is repeated for the gate winding 14 and the core 10 carried back to negative saturation. The core 10 will thus travel back and forth from positive to negative saturation, the two capacitors 32 and 35 will retain equal voltages, and the current in any load connected across the output terminals 34 and 37 will be zero.

The operating point of the saturable core 10 may be changed by current flow through the bias winding 12 without affecting the perfect balance between the two halves of the amplifier as long as the bias current is of the same periodicity as the source applied to the transformer 21. Thus, during the first half cycle described above if the bias drives the core 10 towards positive saturation, the core will saturate that much earlier. On the second half cycle, however, the bias will be of a polarity to drive the core towards negative saturation so that the core 10 will saturate earlier by the same amount on the negative half cycle. The two capacitors 32 and 35 are again charged to the same voltage and the net effect is zero.

In other words, the action of the bias does not shift the null of the amplifier but merely sets its operating point; i.e., the point at which the top half of the amplifier conducts or fires during the first half cycle and at which the bottom half conducts or fires during the second half cycle.

To comprehend more fully the action of the control winding 11 and bias winding 12, and the high gain provided by the inventive magnetic amplifier, it should be understood that in a magnetic amplifier there are two opposing actions; first, the action of the voltage impressed on the gate windings causing current flow therethrough to saturate the core in a given direction according to the polarity of the supply voltage at any instant and, second, the action of the net control current which opposes the action of the gate winding and tends to reset the core away from saturation. In a saturable reactor the two currents act simultaneously to provide a very low gain fixed by the ratio of turns of the windings. In contrast, in what is termed a self-saturating or magnetic amplifier, of the type described herein, diodes connected in series with the gate windings remove the gate voltages for an entire half cycle (in the prior art type of amplifier) so that only the control current is acting at that time. The effect of control current is thus much magnified and the gain of the amplifier much higher. In other words, to secure high gain the gate windings must be disconnected for part of the time to allow the control current to act alone.

Returning to FIGURE 1, a current flow through the control winding 11 upsets the balance between the upper and lower halves of the amplifier. Note that the control current acts during that period in the half cycles when the diodes 28 and 29 are blocked by the voltage across the capacitors 32 and 35. Current through the bias winding acts in the same way.

Assuming that the control current in the winding 11 is in a direction to drive the core 10 towards positive saturation on the first half cycle described above, the core 10 will then saturate earlier than it otherwise would on this half cycle if the gate and bias winding currents were acting alone, and a larger voltage will appear across the output circuit 30.

During the free period at the beginning of the second half cycle, the control current will still drive the core 10 further towards positive saturation and it will saturate later than it otherwise would on this second half cycle if bias and gate winding currents were acting alone and a smaller voltage will be developed across the output circuit 31. Therefore a net differential voltage will appear across the output terminals 34 and 37 causing a current to flow in any load connected to the terminals.

If the applied control current in the control winding 11 is of opposite polarity, the action in the amplifier will be the same except that the polarity of the net output voltage will be reversed.

The amplifier circuits of FIGURE 1 may be constructed to provide desired current gains, for example on the order of 100, and the drift characteristics and freedom from other extraneous effects in such amplifiers have been found outstanding.

Figure 2:
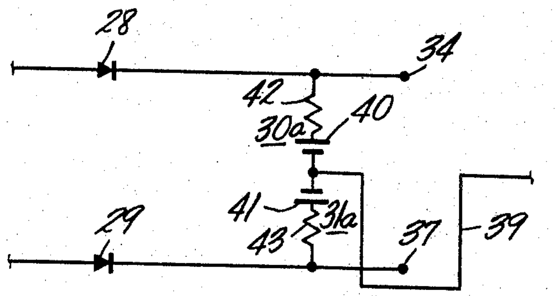
FIGURES 2 to 6 illustrate modifications of portions of the circuit of FIGURE 1 all embodying the principles of the invention.

Instead of using the capacitors 32 and 35 to provide voltage blocking the diodes 28 and 29, a fixed D-C voltage may be used to block each rectifier for a portion of each half cycle. Referring to FIGURE 2, properly polarized D-C sources 40 and 41 respectively in series with resistors 42 and 43 comprise output circuits **30*a* and 31*a* across which the output terminals 34 and 37** provide a differential output in the manner described in connection with FIGURE 1.

Figure 3:
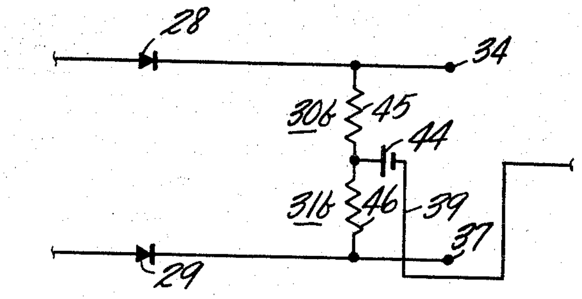

A single D-C source 44 may also be interposed in the conductor 39, as shown in FIGURE 3, to supply a fixed blocking potential to the diodes 28 and 29 through the output circuits **30*b* and 31*b* comprised of resistors 45 and 46, respectively. Operation of this circuit to provide a differential output across the terminals 34 and 37** is the same as described in connection with FIGURE 1.

Figure 4:
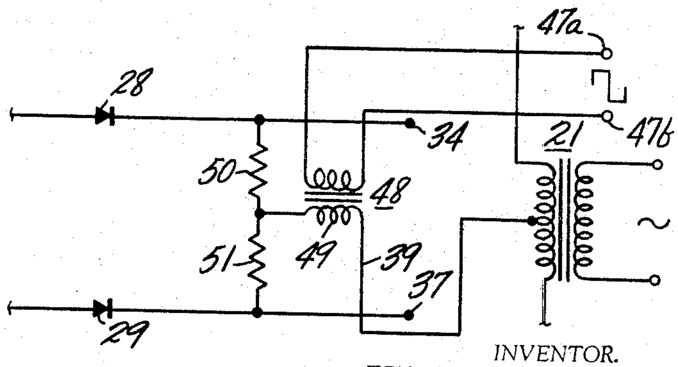

As shown in FIGURE 4, an A-C blocking voltage may be provided for the rectifiers 28 and 29 by supplying to terminals **47*a* and 47*b*, which are connected to a further transformer 48 having a secondary winding 49 in series in the conductor 39, a source of voltage having the same periodicity as the voltage applied to the transformer 21. The voltage must also have such a wave shape and magnitude that during part of one-half cycle it provides a voltage across the secondary winding 49 greater than the voltage applied by the secondary winding 22, and during another part of the half cycle it provides a voltage across the winding 49 less than the voltage supplied by the winding 22. For example a square wave as shown may be used. When properly polarized, the voltage supplied through a resistor 50 to the diode 28 and a resistor 51 to the diode 29** will block the diodes for the portion of each half cycle that it exceeds the applied voltage, thereby enabling operation of the magnetic amplifier as described in connection with FIGURE 1.

Figure 5:
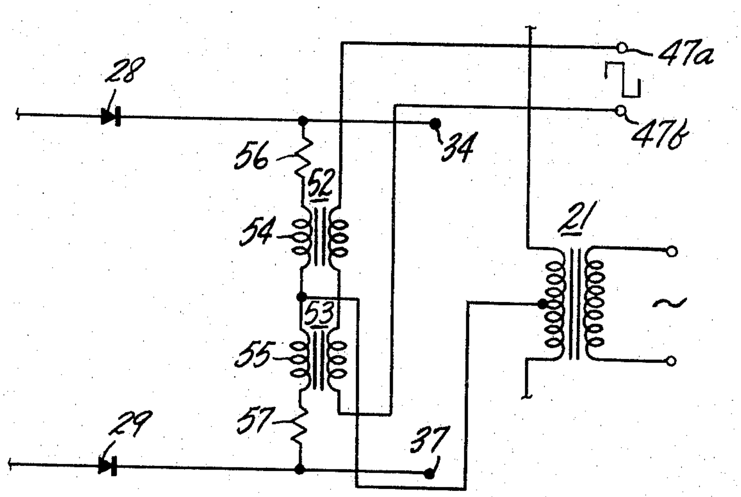

Still another arrangement to provide blocking voltage for the diodes 28 and 29 is shown in FIGURE 5 wherein the terminals **47*a* and 47*b* are joined to series connected primary windings of transformers 52 and 53 having their secondary windings 54 and 55 connected through resistors 56 and 57 to provide suitable blocking voltages to the diodes 28 and 29**. The action is essentially the same as that discussed in connection with FIGURE 4, and the operation as described in FIGURE 1.

Figure 6:
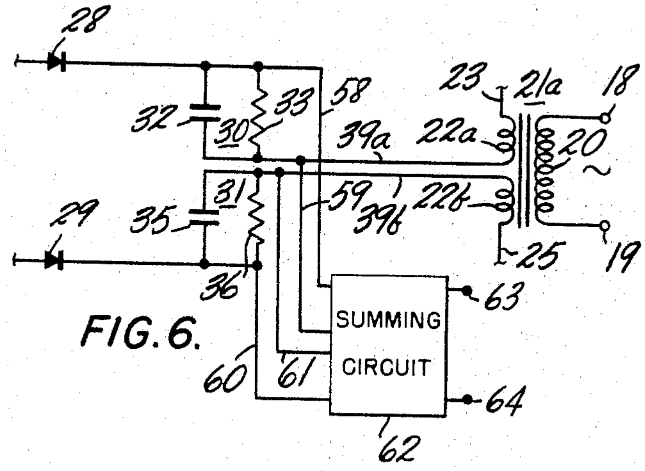

Instead of directly summing the voltages of the output circuits 30 and 31, or of the output circuits shown in FIGURES 2 to 5, conductors 58, 59 and 60, 61 (FIGURE 6) are joined to the output circuits 30 and 31, respectively, and lead to a summing circuit 62. For example the control winding of another magnetic amplifier may be used to sum these voltages. The sum of the voltages will appear across output terminals 63 and 64 of the summing circuit and the terminals may be coupled to a suitable load. A transformer **21*a* connected to a source carries separate secondary windings 22*a* and 22*b* to energize the amplifier through conductors 23, 39*a* and 25, 39*b***. Operation of the circuit is otherwise the same as that of FIGURE 1.

Figure 7:
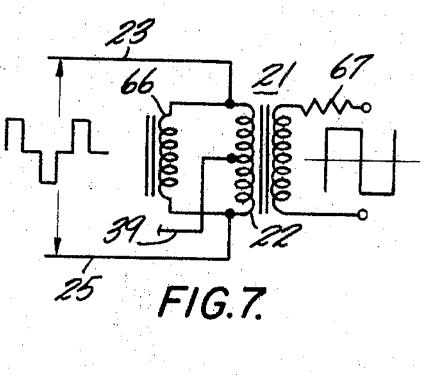
FIGURE 7 shows a circuit that may be used in connection with the inventive magnetic amplifier.

To provide the time sharing necessary for the control current action, a source of voltage with periodic reversals of polarity and non-uniform in magnitude over each half cycle is required. Thus, a square wave does not meet those requirements and must be transformed in a suitable manner into a useful waveform. Referring to FIGURE 7, the transformer 21 has impressed across its input terminals a square wave unsuitable for use in the magnetic amplifier. A choke 66 wound on a saturable core and connected across the secondary winding 22 of the transformer together with a series connected resistor 67 in the primary provides a waveform (shown in FIGURE 7) across the conductors 23 and 25 which meets the requirements of the inventive magnetic amplifier. Thus, when the choke 66 saturates it places a low impedance across the transformer and the voltage then appears across the resistor 67. If desired, other wave shaping circuits, for example integrators, may be used to provide suitable supply voltages for the magnetic amplifier.

While the magnetic amplifier of FIGURE 1 has outstanding drift characteristics and freedom from extraneous effects, it is not balanced to ground and the choke 17 results in a higher impedance to ground from one side than the other. Therefore, its common mode rejection (resistance to A-C stray pickup) is not as great as required in certain applications. Moreover, since the two sides of the balanced output are derived from different half cycles of the supply voltage, distortion or asymmetry in the supply wave form will cause zero shift.

Figure 8:
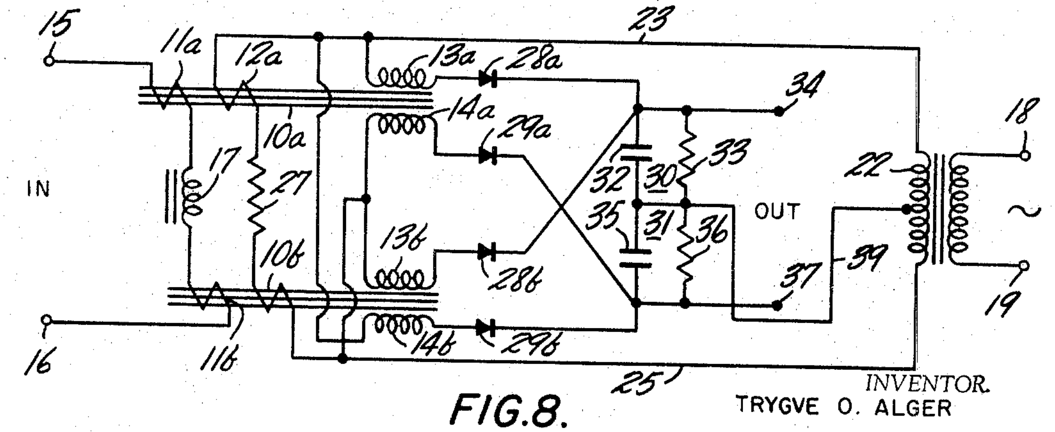
FIGURE 8 is a balanced full wave magnetic amplifier in accordance with the invention.

To provide even greater stability, two of the balanced amplifiers of FIGURE 1 may be connected back to back, as shown in FIGURE 8, to provide a full wave balanced amplifier on two cores. In this circuit both sides of the differential output have contributions from each half cycle and the effects of asymmetry are balanced out. Single components of FIGURE 8 similar to those of FIGURE 1 have been designated by the same reference numerals as corresponding components in FIGURE 1, while duplicate components in FIGURE 8, similar to those of FIGURE 1, have been assigned numerals with suffixes *a* and *b*.

Operation of the cores **10*a* and 10*b* of the full wave balanced amplifier of FIGURE 8 is exactly as described in connection with FIGURE 1. However, the capacitors 32 and 35 are both charged on each half cycle. Thus, while the gate winding 13*a* is acting to charge the capacitor 32, the gate winding 14*b* is charging the capacitor 35. On the other half cycle the windings 13*b* and 14*a* act to charge the capacitors 35 and 32** respectively. It has been found that drift and freedom from any external effects in this amplifier are far smaller than any magnetic amplifier previously known.

It will be understood that the above described embodiments of the invention are illustrative only and modifications will occur to those skilled in the art. Therefore, the invention is not to be limited to the specific apparatus disclosed herein but is to be defined by the appended claims.

I claim:

1. A balanced magnetic amplifier comprising a saturable magnetic core carrying a plurality of windings including a control winding and at least a first and second gate winding, a rectifier and output resistor connected in series with each of the gate windings, circuit means connecting the first and second gate winding series circuits in out of phase relation to a source of voltage having periodic reversals of polarity and non-uniform in magnitude over each half cycle to tend to cause current flow through a different one of the series circuits during alternate half cycles of the voltage source, blocking voltage means coupled to each of the gate winding series circuits, said blocking voltage means preventing conduction of the rectifier in the first gate winding series circuit during a portion of each of the half cycles of the voltage source which tends to cause current flow through the first gate winding series circuit and preventing conduction of the rectifier in the second gate winding series circuit during a portion of each of the half cycles of the voltage source which tends to cause current flow through the second gate winding series circuit, and means adding differentially the two voltages across the output resistors.

2. A balanced magnetic amplifier as defined in claim 1, wherein the blocking voltage means comprises a capacitor connected across each of the output resistors.

3. A balanced magnetic amplifier as defined in claim 1, wherein the blocking voltage means comprises D-C voltage means coupled to the rectifier in each of the gate winding series circuits so as to oppose conduction therethrough.

4. A balanced magnetic amplifier as defined in claim 1, wherein the blocking voltage means comprises an A-C voltage means having the same periodicity as the voltage source and coupled to the rectifier in each of the gate winding series circuits so as to periodically oppose conduction therethrough at a rate determined by the frequency of the A-C voltage means.

5. A balanced magnetic amplifier comprising a saturable magnetic core carrying a plurality of windings including a control winding and at least two gate windings, means to impress across a circuit including one of the gate windings voltage half cycles of one polarity and across a circuit including the other gate winding voltage half cycles of the opposite polarity from a source of voltage having periodic reversals of polarity and non-uniform in magnitude over each half cycle to drive the core in opposite directions of saturation during alternate half cycles, means coupled to each of the circuits to block voltage from the gate windings during portions of the half cycles to provide time for current in the control winding to act on the core, and the unblocked portions of the half cycles providing time for current in the gate windings to act on the core.

6. A balanced magnetic amplifier comprising a saturable magnetic core, means to bias the core, a control winding and two gate windings on the core, an output circuit including a capacitor shunted by a resistor coupled to each gate winding, means for obtaining from a source of voltage having periodic reversals of polarity and non-uniform in magnitude over each half cycle two supply voltages of opposite polarities, means impressing one of the supply voltages on a first series circuit and the other of the supply voltages on a second series circuit to tend to cause current flow through a different one of the series circuits during alternate half cycles of the voltage source, each of the series circuits comprising a rectifier, and a different one of the gate windings and the output circuit connected thereto; a voltage developed across each of the capacitors to block conduction through the rectifier in the series circuit within which it is included during a portion of each of the half cycles of the voltage source that the supply voltage tends to cause current flow through said series circuit within which the capacitor is included, and means adding differentially the voltages across the output circuits.

7. A balanced magnetic amplifier comprising two saturable magnetic cores each of which carries a plurality of windings including a control winding and at least two gate windings, two output resistors, a first rectifier and one of the output resistors connected in series with one gate winding on the first core, a second rectifier and said one output resistor connected in series with one gate winding on the second core, a third rectifier and the other output resistor connected in series with the other gate winding on the first core, a fourth rectifier and said other output resistor connected in series with the other gate winding on the second core, circuit means connecting the two gate winding series circuits carried by each of the cores in out of phase relation to a source of voltage having periodic reversals of polarity and non-uniform in magnitude over each half cycle to tend to cause current flow through a different one of the series circuits connected to each of the cores during alternate half cycles of the voltage source, one of the gate windings on the first core and the gate winding on the second core out of phase therewith being in series with said one of the output resistors, the other two gate windings being in series with the other of the output resistors, blocking voltage means coupled to each of the series circuits, said blocking voltage means preventing conduction of the first, second, third and fourth rectifiers during a portion of each of the half cycles of the voltage source which tends to cause current flow through the series circuits including said first, second, third and fourth rectifiers, respectively, and means adding differentially the two voltages across the output resistors.

8. A balanced magnetic amplifier as defined in claim 7, wherein the blocking voltage means comprises a capacitor connected across each of the output resistors.

9. A balanced magnetic amplifier as defined in claim 7, wherein the blocking voltage means comprises D-C voltage means coupled to the rectifier in each of the series circuits so as to oppose conduction therethrough.

10. A balanced magnetic amplifier as defined in claim 7, wherein the blocking voltage means comprises an A-C voltage means having the same periodicity as the voltage source and coupled to the rectifier in each of the series circuits so as to periodically oppose conduction therethrough at a rate determined by the frequency of the A-C voltage means.

11. A balanced magnetic amplifier comprising two saturable magnetic cores, means to bias each of the cores, a control winding and two gate windings on each of the cores, two output circuits each including a capacitor shunted by a resistor, means for obtaining from a source of voltage having periodic reversals of polarity and non-uniform in magnitude over each half cycle two supply voltages of opposite polarities, means impressing one supply voltage on first and fourth series circuits the first of which includes one of the gate windings on the first core, a first rectifier and one of the output circuits, and the fourth of which includes one of the gate windings on the second core, a fourth rectifier and the other of the output circuits, the one supply voltage tending to cause current flow through said first and fourth series circuits during half cycles of one polarity of the voltage source, means impressing the other supply voltage on second and third series circuits the second of which includes the other gate winding on the second core, a second rectifier, and said one of the output circuits, and the third of which includes the other gate winding on the first core, a third rectifier and said other of the output circuits, the other supply voltage tending to cause current flow through said second and third series circuits during half cycles of the opposite polarity of the voltage source, voltages developed across the capacitors in the output circuits to block conduction through the first and fourth rectifiers during a portion of each of the half cycles of said one polarity of the voltage source which tends to cause current flow through the first and fourth series circuits and to block conduction through the second and third rectifiers during a portion of each of the half cycles of said opposite polarity of the voltage source which tends to cause current flow through the second and third series circuits, and means adding differentially the two voltages across the output circuits.

References Cited

UNITED STATES PATENTS 2,946,000 7/1960 Malick ---------------- 330—8

FOREIGN PATENTS 916,650 8/1954 Germany.

ROY LAKE, *Primary Examiner.*

NATHAN KAUFMAN, *Examiner.*